US010028121B2

(12) United States Patent
Artuso

(10) Patent No.: US 10,028,121 B2
(45) Date of Patent: Jul. 17, 2018

(54) DETERMINING DEVICE LOCATIONS FOR EMERGENCY SERVICE CALLS

(71) Applicant: T-Mobile USA, Inc., Bellevue, WA (US)

(72) Inventor: Daniel Frank Artuso, Concord, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 137 days.

(21) Appl. No.: 15/093,680

(22) Filed: Apr. 7, 2016

(65) Prior Publication Data
US 2017/0295479 A1    Oct. 12, 2017

(51) Int. Cl.
*H04W 4/22*    (2009.01)
*H04W 4/90*    (2018.01)
*H04W 12/08*   (2009.01)
*H04W 4/02*    (2018.01)
*H04W 84/12*   (2009.01)

(52) U.S. Cl.
CPC ............... *H04W 4/90* (2018.02); *H04W 4/02* (2013.01); *H04W 4/22* (2013.01); *H04W 12/08* (2013.01); *H04W 84/12* (2013.01)

(58) Field of Classification Search
CPC ........ H04W 4/22; H04W 64/00; G01S 5/0205
See application file for complete search history.

(56) References Cited

U.S. PATENT DOCUMENTS

| 2010/0194605 | A1 | 8/2010 | Samsalovic et al. |
| 2011/0207429 | A1* | 8/2011 | Maier .................... H04W 64/00 455/404.2 |
| 2013/0260749 | A1 | 10/2013 | Annamalai et al. |
| 2014/0046771 | A1* | 2/2014 | Parker .................... G06Q 30/02 705/14.64 |
| 2014/0113584 | A1* | 4/2014 | Narkar .................... G06Q 30/04 455/406 |
| 2014/0199959 | A1* | 7/2014 | Hassan ................. G01S 5/0205 455/404.2 |
| 2015/0141056 | A1* | 5/2015 | Fefilatyev ......... G06F 17/30371 455/456.3 |

OTHER PUBLICATIONS

The PCT Search Report and Written Opinion dated Jul. 27, 2017 for PCT application No. PCT/US2017/025871, 14 pages.

* cited by examiner

*Primary Examiner* — Myron K Wyche
(74) *Attorney, Agent, or Firm* — Lee & Hayes, PLLC

(57) ABSTRACT

A mobile phone or other mobile device is configured to compute a location code based on Wi-Fi or other wireless networking configuration parameters. The location code is computed as a cryptographic hash of the configuration parameters and is provided to a telecommunications system that supports Wi-Fi or other WLAN voice services. The telecommunications system maintains one or more location tables, each of which indicates multiple location codes and corresponding street addresses. When processing an emergency 9-1-1 call to an emergency response service, the system looks up the street address of the calling mobile device based on the most recently provided location code, and provides the street address to the emergency response service.

19 Claims, 5 Drawing Sheets

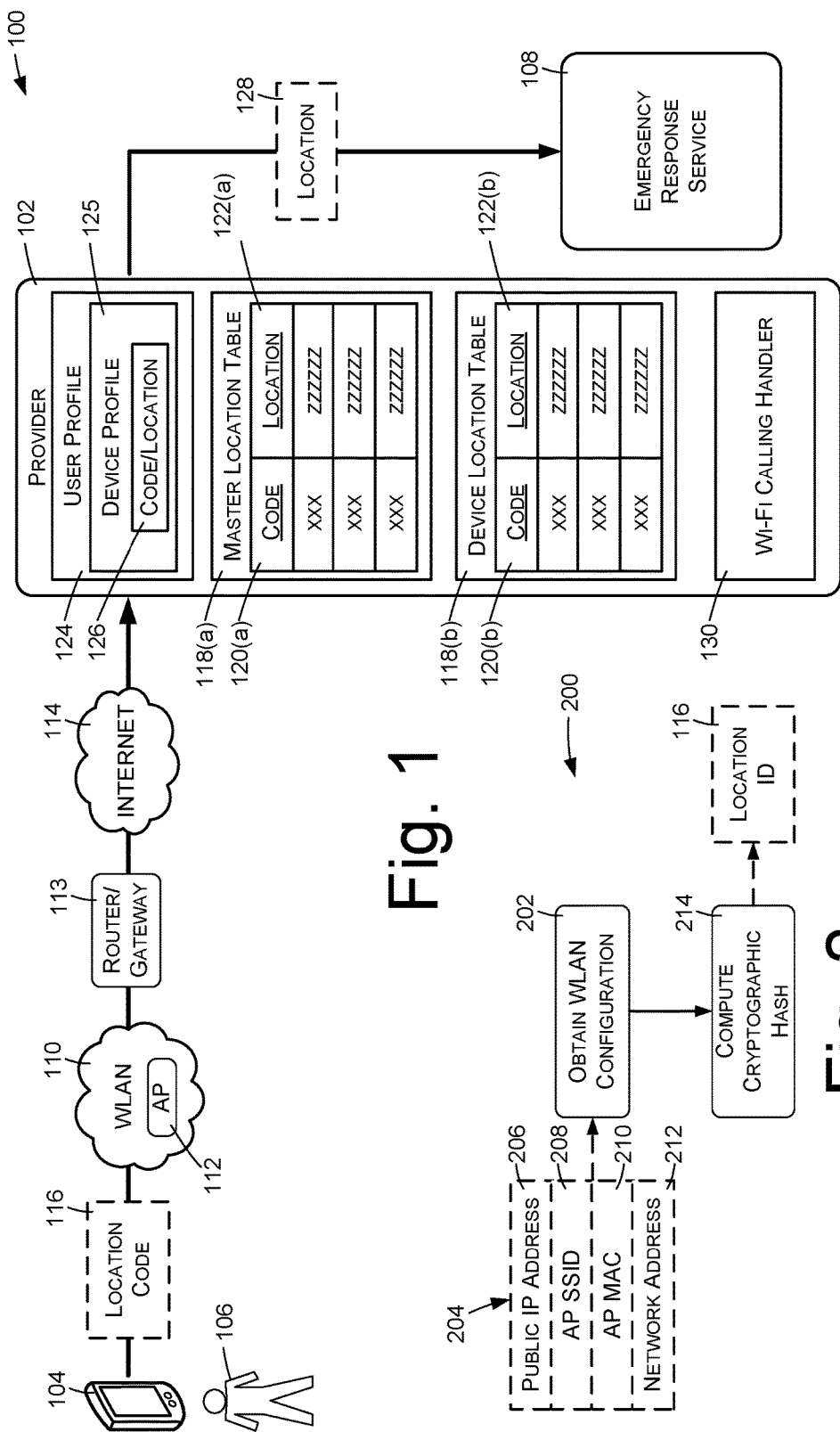

DETERMINING DEVICE LOCATIONS FOR EMERGENCY SERVICE CALLS

BACKGROUND

Mobile telecommunications devices, such as smartphones, tablet computers, laptop computers, etc., can commonly communicate using a cellular telecommunications network. Such a cellular network is typified by long distance communications networks over licensed spectrum. In some cases, mobile telecommunications devices may also or alternatively use a wireless point-to-point communications network such as a wireless local-area network (WLAN), which facilitates short-distance communications using unlicensed spectrum. For example, a WLAN may be implemented at least in part by Wi-Fi or Bluetooth technologies.

A typical example of a mobile telecommunications device is a smartphone that has a data connection over a cellular network, but at the same time may implement voice-over-IP (VoIP) over a WLAN for voice communications in certain situations.

There are a number of reasons that a user may desire to utilize a WLAN for voice communications. As an example, the user may be at a location where quality of service over a cellular telecommunications network is not as good or reliable as service over an available WLAN. As another example, the user may determine that voice communications over a WLAN may cost less than the same voice communications over a cellular telecommunications network, e.g., long distance calling charges may be cheaper via WLAN than over a cellular telecommunications network.

The ability to access emergency response services by dialing 9-1-1 is a vital component of public safety and emergency preparedness. The Federal Communications Commission (FCC) has established a set of rules and regulations that require service providers to deliver enhanced emergency (E911) services to their subscribers. In particular, service providers are required to provide a current location of a 9-1-1 caller to emergency services. In the case of mobile devices, however, the current location of the user can be difficult to determine.

When 9-1-1 is dialed over a cellular network, a service provider attempts to determine the position of the calling user by triangulation. This results in a set of geographical coordinates, such as a latitude and a longitude, which is sent to an emergency response service. In some cases, the geographical coordinates may be converted to a street address that is provided to the emergency response service.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 1 is a block diagram illustrating an example system in which a mobile telecommunications device may use the services of a telecommunications provider to dial voice calls to an emergency response service.

FIG. 2 is a flow diagram illustrating actions that may be performed by the mobile telecommunications device to produce a location code.

DETAILED DESCRIPTION

Figure 3:
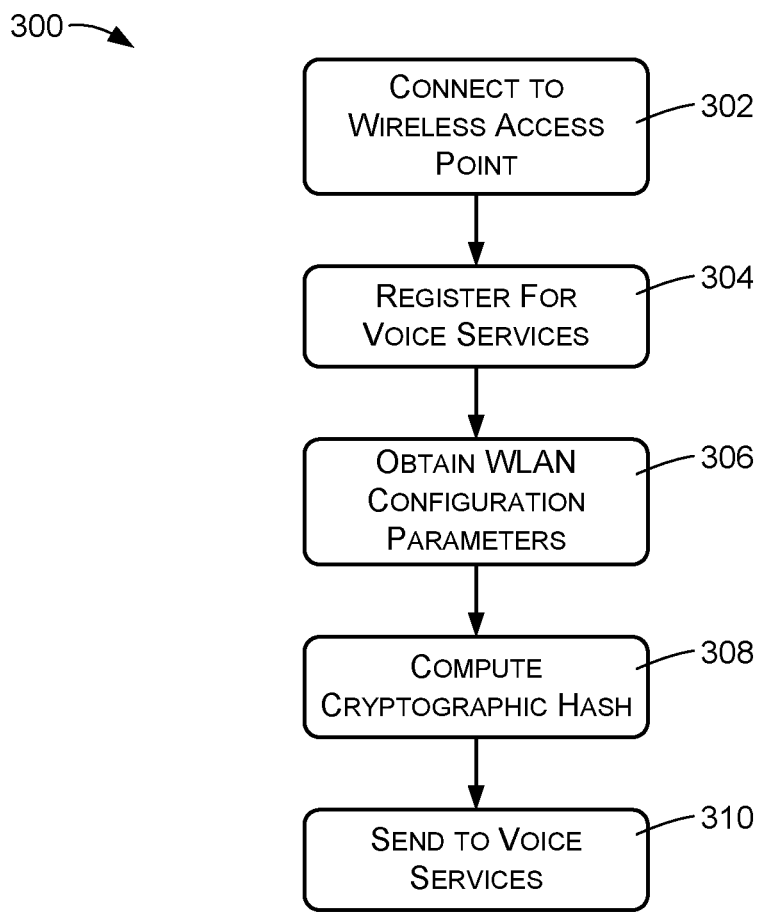
FIG. 3 is a flow diagram illustrating actions that may be performed by the telecommunications device to update a telecommunications provider with location information.

A telecommunications provider may support voice calls via communications through both a cellular communications network and the Internet. Mobile devices such as smartphones may support what is referred to as Wi-Fi Calling, in which a device communicates with its telecommunications provider through the Internet by connecting to a Wi-Fi Access Point or other wireless access point.

In order to support location reporting for 9-1-1 emergency response calls, a device that registers with a telecommunications provider for Wi-Fi Calling provides a location code that is unique to the wireless local-area network (WLAN) that the device has joined. The location code is a cryptographic hash of WLAN or access point configuration parameters, such as a public IP (Internet protocol) address, a MAC (media access control) address of an access point, a network IP address of the WLAN, and the SSID (service set identifier) of the access point.

The telecommunications provider maintains database tables or other data structures that specify street addresses or other location information for each location code. Upon receiving a particular location code for the first time, the telecommunication provider may query the user or take other steps to determine the corresponding location, and may then add the location code and the corresponding location to one of the database tables. Otherwise, when receiving a known location code from a user's mobile device, the telecommunication provider updates the location of the user by referencing the database tables.

When a user dials 9-1-1, the telecommunication system connects the user to an emergency response service and provides the current user location to the emergency response service. The telecommunication system determines the user location from the user/device profile.

Using a cryptographic hash of WLAN configuration parameters protects the privacy of the WLAN's configuration, enables faster database table searches, and avoids the necessity of storing location information on the mobile device. Location codes are shared across the system so that individual users do not always have to enter location information and can easily be validated. Instead, the system may determine the location information based on location codes and corresponding locations that have previously been reported by other users and devices.

FIG. 1 illustrates an example system 100 in which a telecommunications provider 102 may determine the current location of a mobile device 104 that is associated with a user 106, and may report the current location of the device 104 to an emergency response service 108 when the user initiates a 9-1-1 emergency services voice call.

Note that although the numerals 9-1-1 are used in the United States of America to initiate calls to emergency services, other numeric sequences, numbers, or codes may be used in different countries or geographic areas for the same or similar purposes. For purposes of discussion, "9-1-1" will be considered to be equivalent to the different numeric sequences, numbers or codes that may be used in different parts of the world.

It is assumed in this example that the user 106 and mobile device 104 are at or within a location that has a wireless local-area network (WLAN) 110 such as a local Wi-Fi network. The mobile device 104 has Wi-Fi capabilities and connects to the WLAN 110 through a wireless access point (AP) 112, such as a Wi-Fi Access Point or other WLAN access point. The WLAN 110 allows the mobile device 104 to connect to various networked services and entities through the public Internet 114. In some situations, a particular WLAN may have multiple APs 112, which may be associated with or may communicate through a gateway and/or router 113.

The WLAN 110 may comprise a Wi-Fi network implemented in accordance with IEEE 802.11 standards and protocols, and the WLAN AP 112 may comprise a Wi-Fi Access Point. Alternatively, the WLAN 110 may be implemented using other wireless technologies such as Bluetooth.

In some embodiments, the mobile device 104 may comprise a cellular telephone and/or may have capabilities for communicating and conducting voice conversations using a cellular telecommunications network. The mobile device 104 may be associated with and supported by the telecommunications provider 102, for example. The telecommunications provider 102 may provide a cellular communications infrastructure that includes geographically dispersed base stations, which may include towers and antennas for communicating with subscribing mobile devices and for implementing various types of communications between such mobile devices. The provider 102 may implement a core network, such as an IMS (IP Multimedia Subsystem) core, and various types of hardware, software, and services in support of the associated telecommunication standards and protocols.

In addition to facilitating cellular communications between mobile devices, the provider 102 may support voice calls using non-cellular communications, such as by using the WLAN 110 and/or other unlicensed mobile access (UMA) technologies. When the device 104 is connected to the Internet 114 through the WLAN 110, for example, the device 104 may communicate with the provider 102 and provide voice communications through the WLAN 110 and the Internet 114 rather than through the cellular network of the provider 102. This may be referred to in some cases as Wi-Fi Calling or Unlicensed Mobile Access (UMA), and may utilize voice-over-IP (VoIP) protocols and standards.

The system 100 supports emergency 9-1-1 calls. When dialing the numerals 9-1-1 from the mobile device 104, the user 106 is connected by voice to a nearby emergency response service 108, which is able to send emergency responders to the user's location. The 9-1-1 system is intended and designed to automatically determine a user's current street address based on the telephone number from which the user is calling. In the case of mobile phones, however, the provider 102 may supply address information to the emergency response service 108 in addition to the telephone number of the calling user. Because of the mobility of the device 104, the user street address is not static, and changes as the user moves from location to location.

Upon joining the WLAN 110, the mobile device 104 can be configured to register for Wi-Fi Calling services with the provider 102 and to provide a location code 116 to the provider 102, wherein the location code 116 corresponds uniquely to a current geographic location or address of the device 104. This allows the provider 102 to report the current location of the user 106 and/or device 104 to the emergency response service 108 when the user 106 dials a call to the emergency response service 108.

FIG. 2 illustrates an example method 200 of determining or computing the location code 116, which may be performed by the mobile device 104 upon connecting to the WLAN 110, upon registering for Wi-Fi Calling services with the provider 102, or in other situations as will be described in more detail below.

An action 202 comprises obtaining a current WLAN configuration 204 of the mobile device 104. The WLAN configuration 204 may comprise various parameters that in combination uniquely correspond to the WLAN to which the mobile device 104 is joined and/or to the particular AP 112 to which the device 104 is connected. The WLAN configuration 204 may include, as an example, the public IP address 206 by which the mobile device 104 is represented on the Internet 114. In the embodiment of FIG. 1, the public IP address 206 is the publicly routable IP address of the gateway and/or router 113 that is associated with the Wi-Fi Access Point 112.

As another example, the WLAN configuration 204 may include the SSID (service set identifier) 208 of the AP 112. The SSID 208 is sometimes referred to as the name of the Access Point 112 or the network name of the WLAN 110. As another example, the WLAN configuration 204 may include the MAC (media access control) address 210 of the AP 112. As yet another example, the WLAN configuration 204 may include the IP network address 212 of the WLAN, which comprises the portion of the device's IP address that is not specific to the device itself. The IP network address may be determined by calculating a bitwise "AND" of the device IP address and the IP subnet mask of the WLAN 110. All devices that are part of the WLAN 110 or that are connected to the Internet 114 through the Wi-Fi Access Point 112 share the same IP network address.

The WLAN configuration 204 may comprise different or additional data in other embodiments.

An action 214 comprises computing a cryptographic hash of the WLAN configuration 204. For example, the action 214 may comprise concatenating the elements of the WLAN configuration 204 in a predefined manner that is consistent over time and computing a cryptographic hash of the concatenated elements using a predefined cryptographic hash algorithm that is consistent over time such as a selected variant of SHA (secure hash algorithm). The resulting hash value forms the location code 116.

Returning to FIG. 1, the provider 102 stores one or more location database tables or other data structures 118 that map different location codes 116 to geographic locations and/or physical addresses such as street addresses. In the described embodiment, the provider 102 stores a master location table 118(*a*) and multiple device location tables 118(*b*), where each device location table 118(*b*) corresponds to an individual device 104.

Note that although FIG. 1 shows a single device 104 associated with the user 106, multiple devices may be associated with each user 106. In the described embodiments, the provider 102 maintains separate location information for each of the user devices.

Each location database table 118 has a location code column 120 and one or more address columns 122, such columns corresponding to street address, city, state, etc. Each row of the database table 118 comprises an entry that specifies a particular location code and contains a corresponding physical address. The table 118 is indexed by the location code column 120. For a given location code, the table 118 may be referenced to find a corresponding physical address, such as a street address.

The device location table 118(b) contains entries corresponding to locations at which the mobile device 104 of the user 106 has been registered for Wi-Fi Calling. The master location table 118 contains entries from all of the device location tables 118(b), corresponding to locations at which all mobile devices 104 supported by the provider 102 have been registered for Wi-Fi Calling.

The embodiment of FIG. 1 includes both a master location table 118(a) and multiple device location tables 118(b) in order to speed searches for individual devices. When using this configuration, searching a single device location table 118(b) will often be sufficient for finding the address of the user. In addition, respective device location tables 118(b) allow the provider to maintain an archived history of device locations. Furthermore, the master location table 118(a) may be shared with or made available to other cellular service providers, allowing such providers to determine location information for non-subscribers. In some cases, multiple service providers may utilize a common database or master location table. The hashing algorithm, as well as the format and concatenation order of WAN configuration parameters for hashing, may be standardized across providers to facilitate interoperability.

Note that some embodiments may not utilize individual device location tables, and may instead rely solely on the master location table 118(a). Furthermore, the term "table" is used herein to indicate any type of data structure that establishes correspondences between location codes and addresses. Various types of data structures may be used for maintaining information as described herein.

To populate the location tables 118, the user 106 may be prompted to provide a street address whenever the provider 102 receives an unknown location code 116 from a device associated with the user. An unknown location code is a location code that does not have an entry in either the device location table 118(b) or the master location table 118(a). In cases where the location code is found in the master location table 118(a) but not in the device location table 118(b) of the device 104, the user 106 may be asked to validate the address in the master location table 118(a) corresponding to the location code. After validating, the location code and corresponding address are added to the device location table 118(b) corresponding to the device 104.

The provider 102 maintains a user profile 124 for each user 106, which contains various data regarding the user 106 and the mobile device 104. The user profile may contain one or more device profiles 125, which contain information such as subscription information, quality of service information, and other data regarding the user 106 and/or the account of the user 106. The user profile 124 and/or the device profile 125 may include a current location data field 126 that indicates the last known location of the mobile device 104, based on the location code 116 most recently reported by the mobile device 104. For purposes of discussion, the term user/device profile 124 will be used to reference the user profile 124 and/or the device profile 125 that is specified by the user profile 124.

In the described implantation, the current location data field 126 contains the last known address of the user, corresponding to the most recent location code 116 received from the device 104. When the user 106 dials a 9-1-1 call to the emergency response service 108, a current location 128 is provided to the emergency dispatch center 108 and reported as the location of the user 106, based on the location indicated by the current location data field 126. In other embodiments, the last known location code may be stored in the current location data field, and the corresponding address may be retrieved from the master location table 118(a) or the user location table 118(b) and provided to the emergency dispatch center 108.

The current location data field 126 is potentially updated whenever a location code 116 is received from the mobile device 104. Upon receiving the location code, the provider 102 determines whether the received location code 116 is different than the location code specified by the current location data field 126. If the received location code 116 is different, the provider 102 checks the device location table 118(b) corresponding to the device 104 to determine if there is an existing entry corresponding to the received location code 116. If there is such an entry, the current location data field 126 is updated with the information of the entry and/or to point to the entry of the device location table. If there is not such an entry, the provider 102 checks the master location table 118(a) to determine if there is an existing entry corresponding to the received location code 116. If there is such an entry, the current location data field is updated with the information of the entry and/or to point to the entry of the master location table. In addition, the entry is copied and added to the device location table 118(b). In some cases, the user 106 may be asked to validate the address indicated by the entry before the entry is copied from the master location table 118(a) to the device location table 118(b).

If there is no entry in either the master location table 118(a) or the device location table 118(b) corresponding to the received location code 116, actions may be performed in order to determine the current location of the user 106 and the user's device 104, and to create new entries in the tables 118 reflecting the received location code 116 and the corresponding location. The current location may be obtained, for example, by prompting the user 106 to provide a street address corresponding to their current location. As another example, the device 104 may be queried to determine its GPS coordinates, from which the provider 102 may determine a street address.

Upon receiving the current location corresponding to the new location code, a new entry is created in each of the master location table 118(a) and the device location table 118(b), wherein the new entry comprises the location code and the corresponding address.

The functionality attributed above to the provider 102 may be implemented by various core network servers, services, components, and software, which are represented in FIG. 1 by a Wi-Fi Calling Handler 130. These components may include gateways, administrative components, communication handlers, and so forth that provide voice services for the provider 102.

FIG. 3 shows an example method 300 that may be performed by a mobile telecommunications device to provide location information for a call to an emergency response service. The method 300 may be performed by a mobile device, such as a wireless telecommunications device that is configured to work with both cellular networks and WLANs (wireless local-area networks). The mobile device, for example may comprise a telephone handset, a computer, a smartphone, a wearable device, etc. The mobile device may have a processor, for example, that is configured to execute instructions that, when executed by the processor, direct the mobile device to perform the actions illustrated by FIG. 3.

An action 302 comprises connecting to a wireless local-area network (WLAN) such as a Wi-Fi network, a Bluetooth network, or a other type of point-to-point wireless network. The action 302 may comprise communicating with and connecting to a wireless access point, for example, that sends and receives wireless networking signals within in a limited geographic area such as within a building or other premises. A WLAN, for example, may be implemented in accordance with various standards and protocols defined by and known as IEEE 802.11. The WLAN may provide communications over the Internet with the telecommunications services provider.

An action 304 comprises registering with a voice services provider for voice services, referred to herein as Wi-Fi Calling. The action 304 may comprise, for example, communicating through the Internet with a voice-over-IP (VoIP) calling server or other call handler of a telecommunications service provider. In some cases, the action 304 may include communicating with a packet data gateway (PDG) such as may be part of an IMS (IP Multimedia Subsystem) network supported and provided by the telecommunications services provider.

The remaining actions of FIG. 3 may be performed in conjunction with the registering action 304. An action 306 comprises obtaining configuration parameters that characterize the WLAN to which the mobile device is connected and through which the mobile device is communicating with the telecommunications services provider. The action 306 may comprise accessing configuration settings of the mobile device, and/or may comprise communicating with the access point to access configuration parameters of the access point. Generally, the configuration settings include parameters that in combination are likely to be unique to the WLAN while being common to all of the devices that have joined the WLAN and that are communicating through the WLAN access point. In the described embodiment, the configuration settings comprise the public IP address associated with the mobile device; the access point name (e.g., SSID) of the WLAN access point through which the mobile device is communicating; the MAC (media access control) address of the WLAN access point; and the network IP address of the mobile device (the part of the device's IP address that is common to all devices within the WLAN). Other embodiments may use different or additional parameters.

An action 308 comprise computing a cryptographic hash of the configuration parameters to produce a location code, as described above with reference to FIG. 2. As an example, character representations of the parameters may be concatenated and subjected to a hashing algorithm to produce a code having a fixed or limited length. The particular technique for selecting which WLAN configuration parameters to use, concatenation ordering, and hashing algorithm may be an agreed upon standard, so that the location codes are produced in a consistent manner by different devices over time.

An action 310 comprises sending the location code to the telecommunications provider and/or to the voice services or call handler of the telecommunications provider. Because the location code has been generated based on characteristics of the WLAN and access point with which the mobile device is communicating, and because the WLAN access point serves devices only within a limited geographic area, the location code uniquely corresponds to that limited geographic area.

Although FIG. 3 illustrates sending the location code to the telecommunications provider upon initial connection to an access point, the location code may be sent or re-sent at various times. For example, the location code may be sent to the telecommunications provider at regular intervals, such as every hour. As another example, the mobile device may periodically check the configuration parameters and may recompute and resend the location code whenever the configuration parameters have changed.

As yet another example, the mobile device may compute the location code and send it to the telecommunications provider when making a call to a 9-1-1 call to an emergency response service. Note, however, that in some situations a location code provided in this manner may not correspond to an existing entry in any of the location database tables. In these situations, the last known address of the mobile device may be provided to the emergency response service, based on the data of the user/device profile 124. In addition, the emergency response service may be notified that the reported address may be incorrect, and/or that the reported address corresponds to the last known location of the user.

Figure 4:
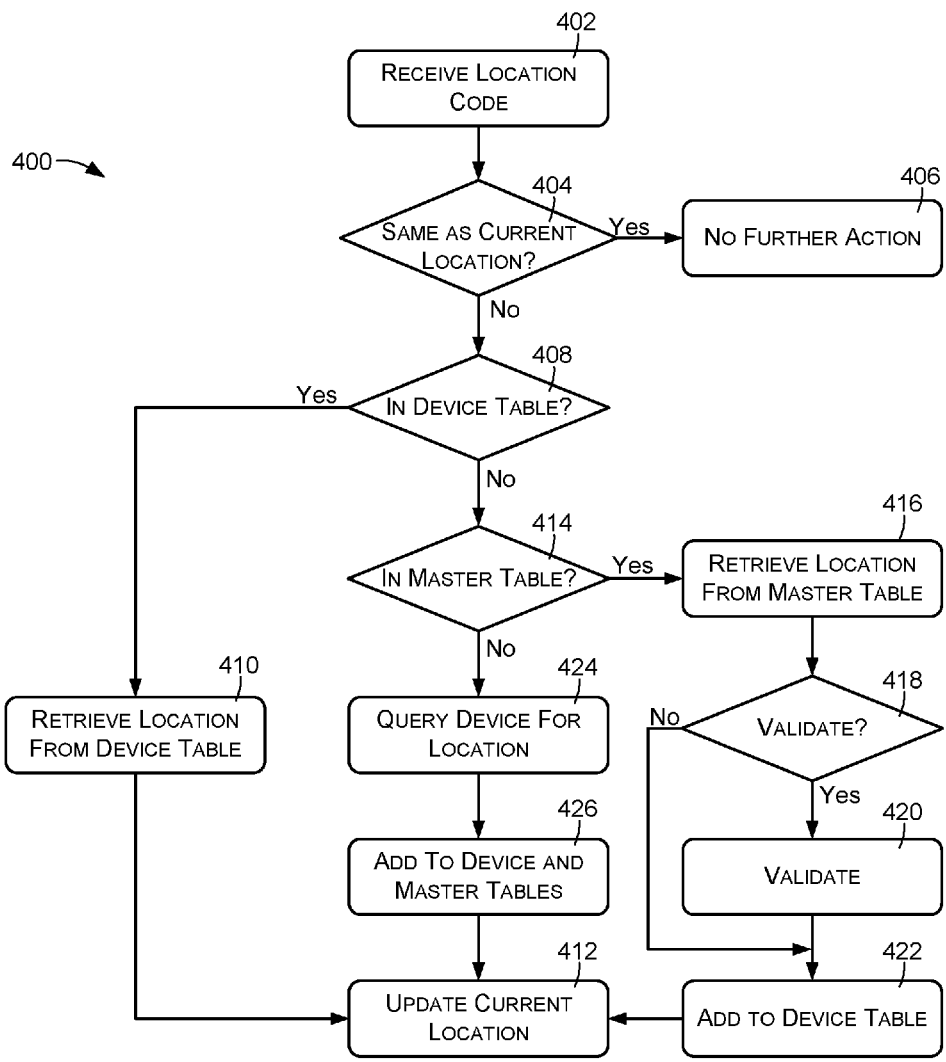
FIG. 4 is a flow diagram illustrating actions that may be performed by the telecommunications provider in response to receiving a location code from a telecommunications device.

FIG. 4 illustrates an example method 400 that may be performed by a telecommunications provider in order to determine and maintain information indicating the locations of user devices of a telecommunications system. In some embodiments, such a telecommunications provider may comprise a cellular communications provider that supports a geographically dispersed infrastructure of cellular communication facilities, including communication towers, antennas, base stations etc., and that also allows communications through the Internet and associated Wi-Fi Access Points or other types of point-to-point access points. The actions of FIG. 4 may be performed at least in part by the core network of the provider, which may as an example be implemented in accordance with IMS. An IMS core may have servers and gateways that support Wi-Fi Calling, allowing mobile phones and other devices to conduct voice communications using local WLANs and access points.

FIG. 4 assumes that the provider maintains multiple device location database tables corresponding respectively to different mobile devices. As described above, each device location table indicates multiple location codes and respectively corresponding locations. The location codes of a particular device location table comprise those codes received from the mobile device of the particular user. A location may comprise a geographic zone or coordinate, or may comprise a street address such as a street name and a street number, city, zip code, county, etc. A location or address may correspond to a business, residence, or other premises, and may indicate one or more of a street name, a street number, a city, a state, a zip code, and building number, a floor, a department, an organization, a room, etc.

The provider also maintains a master location table that indicates multiple location codes and respectively corresponding locations. The master location table comprises codes received from multiple mobile devices, such as location codes received from all of the devices supported by the provider and/or the provider infrastructure.

The method 400 may be performed at various times in response to an action 402 of receiving a location code from a mobile device. For example, a mobile device may provide a location code in response to connecting to a WLAN access point and/or when registering for WLAN calling services with the provider. As another example, a mobile device may detect changes in access points and may provide a location code in response to those events. As another example, a mobile device may provide a location code at a periodic interval, such as every hour. In some cases, the mobile device may be configured to incorporate a degree of hysteresis to avoid rapid toggling between adjacent access points. For example, the mobile device may be configured to wait for a specified amount of time before notifying the provider that the device has moved to another access point, or may be configured to report a new location only after connected to a new access point for a specified amount of time.

An action 404 comprises determining whether the received location code is the same as the location code stored in the user profile associated with the mobile device from which the location code has been received, such as the code/location 126 of the user/device profile 124 in FIG. 1. If the received code is the same as the code of the current location as indicated by the user/device profile, no further action is performed, as indicated by the block 406.

Otherwise, if the received location code is different than the location code currently stored in the user/device profile, an action 408 is performed of referencing a device location table to determine a location that corresponds to the received location code. The action 408 may more specifically comprise determining whether the received location code is contained in or indicated by the device location table corresponding to the mobile device from which the location code was received. If the received location code is in the device location table, an action 410 is performed of retrieving the corresponding location from the device location table. An action 412 is then performed of updating the current location of the user and mobile device with the location retrieved from the device location table. For example, the current location of the user and the user's mobile device may be stored in a user/device profile and updated whenever a new and changed location code is received from the mobile device.

If the received location code is not in the device location table, an action 414 is performed, comprising referencing the master location table to determine a location that corresponds to the received location code. The action 414 may more specifically comprise determining whether the received location code is contained in or indicated by the master location table. If the received location code is in the master location table, an action 416 is performed of retrieving the corresponding location from the master location table.

After retrieving the location from the master location table, an action 418 comprises determining whether to validate the retrieved location, such as by querying the user of the mobile device to verify the correctness of the retrieved location. As an example, the provider may in some cases keep track of how many times a particular location code has been validated, and may forego further validations after a particular location code has been validated a particular number of times. As another example, the provider may randomly solicit validations of a particular location code at periodic intervals, such as every six months, to ensure that the location of a particular access point or WLAN has not changed.

If in the action 418 it is determined to validate the location that has been retrieved from the master location table, an action 420 is performed of validating the location. For example, the action 420 may comprise prompting the user through the user interface of the user's mobile device to confirm that the user is indeed at the location. If not, the user may be asked to provide an updated and accurate street address or other location information.

After the action 420, or after the action 418 if it is determined that validation will not be performed, an action 422 is performed of adding the retrieved and potentially validated location to the device location table corresponding to the mobile device from which the location code has been received. The action 412 is then performed of updating the current location of the user in accordance with the location retrieved from the master table.

If in the action 414 the location code is not indicated in the master table, an action 424 may be performed, comprising querying the mobile device for its current location. In some cases, as an example, the action 424 may comprise prompting the user through the user interface of the mobile device to provide an accurate street address or other location information corresponding to the current location of the user. Other techniques, such as retrieving GPS (global positioning system) information from the mobile device may also be used.

An action 426 is then performed of adding the device location to the device and master tables, along with the received location code. The action 412 is then performed of updating the current location of the user in accordance with the location retrieved from the master table.

Figure 5:
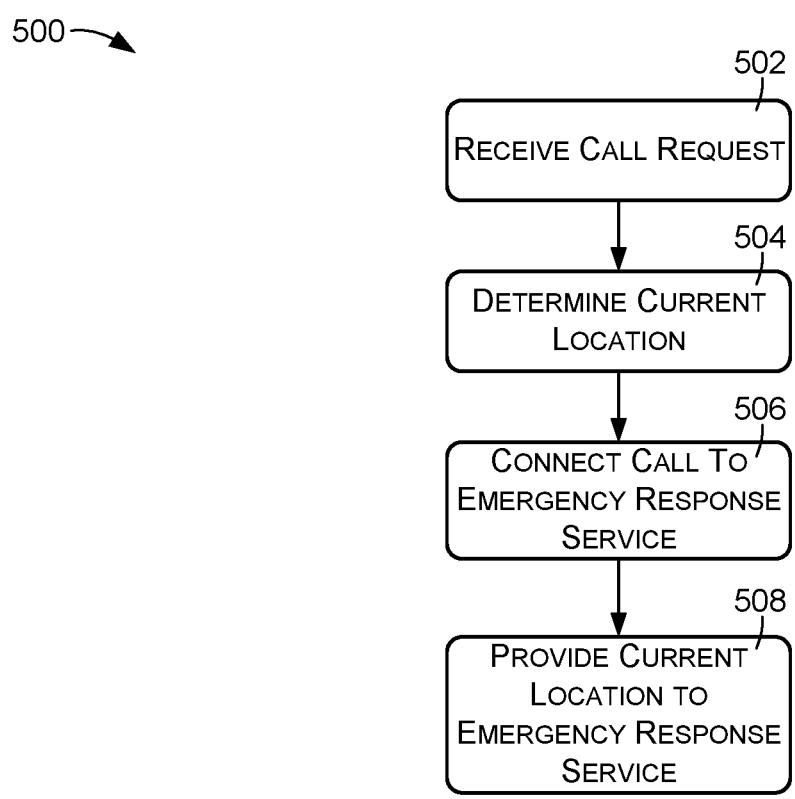
FIG. 5 is a flow diagram illustrating actions that may be performed by a telecommunications provider when implementing a voice call between the mobile telecommunications device and the emergency response service.

FIG. 5 illustrates an example method 500 of processing a call directed by a user and the user's mobile device to an emergency response service, such as a 9-1-1 voice call. The method 500 may be performed, for example, by the core network of a telecommunications provider, such as by components of an IMS core.

An action 502 comprises receiving a call request from the mobile device, wherein the request is a request for voice communications with the emergency response service. The action 502 may be conducted through a WLAN access point and may represent various types and combinations of communications between the mobile device and the core network of the telecommunications provider.

An action 504 comprises determining the current location of the user and/or the mobile device of the user. The action 504 may be performed in some cases by referencing the user/device profile corresponding to the calling device, which has been updated in accordance with the method 300 to indicate the current location of the user and or the mobile device of the user. In some cases, the call request may specify a location code, and the action 504 may include performing most or all of the actions shown in FIG. 4.

An action 506 comprises connecting or completing the call to the emergency response service, such as providing a voice communication channel between the mobile device and the emergency response service. An action 508 comprises providing and/or reporting the current location of the user and/or the mobile device to the emergency response service in conjunction with the voice call.

The functionality described above and attributed to the telecommunications provider may be implemented using one or more gateway or controller devices, which are generally referred to herein as servers. Each server may comprise a computer having one or more processors that execute instructions that cause the server to perform the described actions.

Figure 6:
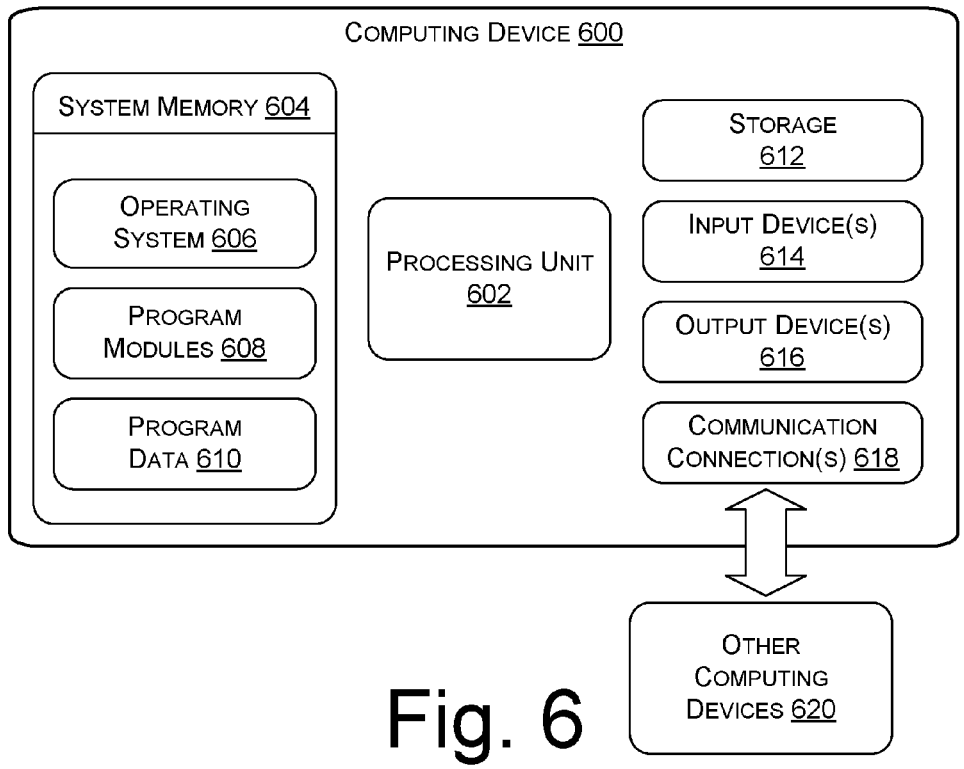
FIG. 6 is a block diagram of an example computing device that may be used to implement various components of a provider infrastructure.

FIG. 6 shows an example configuration of a server computer 600 that may be used, potentially in combination with other server computers, to implement the provider functionality described above. One or more of such server computers may be used to implement components of an IMS core such as routers, gateways, administrative components, etc.

In various embodiments, the server computer 600 may include at least one processing unit 602 and system memory 604. Depending on the exact configuration and type of computing device, the system memory 604 may be volatile (such as RAM), non-volatile (such as ROM, flash memory, etc.) or some combination of the two. The system memory 604 may include an operating system 606, one or more program modules 608, and may include program data 610.

The server computer 600 may also include additional data storage devices (removable and/or non-removable) such as, for example, magnetic disks, optical disks, or tape. Such additional storage is illustrated in FIG. 6 by storage 612.

Non-transitory computer storage media of the server computer 600 may include volatile and nonvolatile, removable and non-removable media implemented in any method or technology for storage of information, such as computer readable instructions, data structures, program modules, or other data. The system memory 604 and storage 612 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server computer 600. Any such non-transitory computer-readable storage media may be part of the server computer 600.

In various embodiment, any or all of the system memory 604 and storage 612 may store programming instructions which, when executed, implement some or all of the function functionality described above as being implemented by the server computer 600. The location tables 118(a) and 118(b) may be stored in the storage 612.

The server computer 600 may also have input device(s) 614 such as a keyboard, a mouse, a touch-sensitive display, voice input device, etc. Output device(s) 616 such as a display, speakers, a printer, etc. may also be included. The server computer 600 may also contain communication connections 618 that allow the device to communicate with other computing devices 620.

Figure 7:
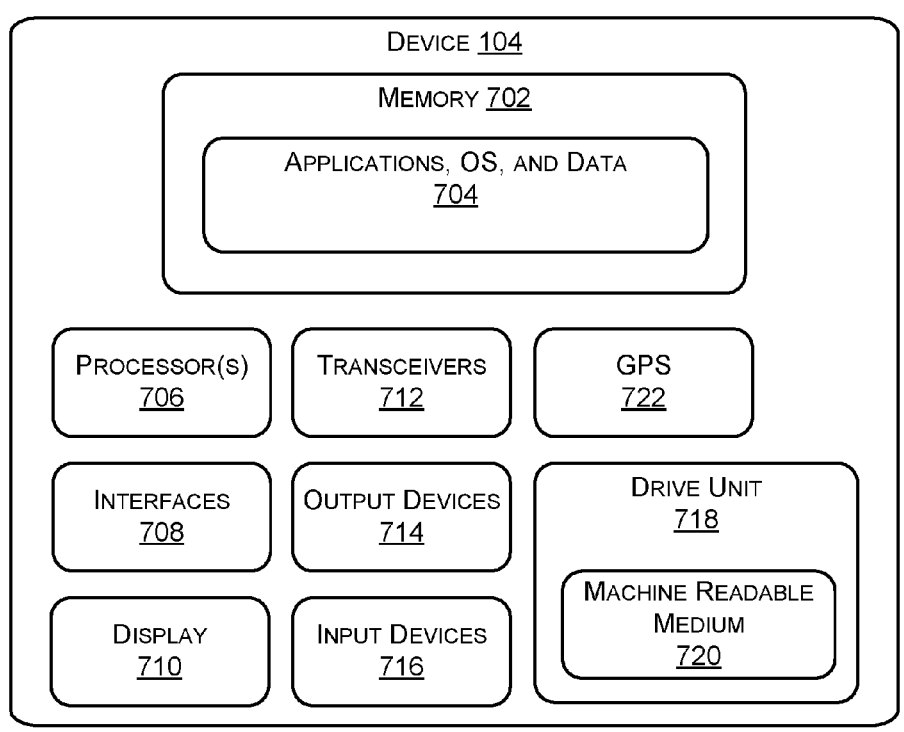
FIG. 7 is a block diagram of an example communication device that may be used in conjunction with the example methods described herein.

FIG. 7 illustrates an example mobile device 104 in accordance with various embodiments. The device 104 may include a memory 702, which may store applications, an operating system (OS), and data 704. The device 104 further includes processor(s) 706, interfaces 708, a display 710, radio transceivers 712, output devices 714, input devices 716, and a drive unit 718 including a machine readable medium 720.

In various embodiments, the memory 702 includes both volatile memory and non-volatile memory. The memory 702 can also be described as non-transitory computer storage media and may include removable and non-removable media implemented in any method or technology for storage of information, such as computer readable instructions, data structures, program modules, or other data. The applications, OS, and data 704 are stored in the memory 702. Additionally, in some embodiments, the memory 702 may include a SIM (subscriber identity module), which is a removable smart card used to identify a user of the device 104 to a service provider network.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 104. Any such non-transitory computer-readable media may be part of the device 104.

In some embodiments, the processor(s) 706 is a central processing unit (CPU), a graphics processing unit (GPU), or both CPU and GPU, or other processing unit or component known in the art.

In various embodiments, the interfaces 708 are any sort of interfaces known in the art. The interfaces 708 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 710 may comprise a liquid crystal display or any other type of display commonly used in telecommunication devices or other portable devices. For example, display 710 may be a touch-sensitive display screen, which may also act as an input device or keypad, such as for providing a soft-key keyboard, navigation buttons, or the like.

In some embodiments, the transceivers 712 include any sort of transceivers known in the art. For example, the transceivers 712 may include radio radios and/or radio transceivers and interfaces that perform the function of transmitting and receiving radio frequency communications via an antenna, through a cellular communication network of a wireless data provider. The radio interfaces facilitate wireless connectivity between the device 104 and various cell towers, base stations and/or access points.

In some embodiments, the output devices 714 include any sort of output devices known in the art, such as a display (already described as display 710), speakers, a vibrating mechanism, or a tactile feedback mechanism. The output devices 714 also include ports for one or more peripheral devices, such as headphones, peripheral speakers, or a peripheral display.

In various embodiments, the input devices 716 include any sort of input devices known in the art. For example, the input devices 716 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 104 may also have a GPS (global positioning system) receiver 722 for determining the current location of the device 104 based on signals received from satellites.

The machine readable medium 720 stores one or more sets of instructions (e.g., software) such as a computer-executable program that embodies operating logic for implementing and/or performing any one or more of the methodologies or functions described herein. The instructions may also reside, completely or at least partially, within the memory 702 and within the processor 706 during execution thereof by the device 104. The memory 702 and the processor 706 also may constitute machine readable media 720.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
maintaining a first data structure, the first data structure indicating multiple location codes and respectively corresponding locations;
receiving a first location code from a first mobile device;
referencing the first data structure to determine a first location corresponding to the first location code;
receiving a first call request from a first mobile device, the first call request comprising a request for voice communications with an emergency response service; and
reporting the first location to the emergency response service,
wherein the location code comprises a cryptographic hash of one or more configuration parameters of the mobile device.

2. The method of claim 1, wherein the locations comprise street addresses.

3. The method of claim 1, the first data structure being associated with the first mobile device, the method further comprising:
maintaining a second data structure, the second data structure being associated with a second mobile device;
receiving a second call request from the second mobile device, the second call request comprising a request for voice communications with the emergency response service;
receiving a second location code from the second mobile device;
referencing the second data structure to determine a second location that corresponds to the second location code; and
reporting the second location to the emergency response service.

4. The method of claim 1, further comprising:
receiving a second location code from a second mobile device;
determining that the second location code is not indicated by the first data structure;
prompting a user of the second mobile device for a current location; and
adding the second location code and the current street location to the first data structure.

5. The method of claim 1, further comprising maintaining a second data structure, the second data structure indicating location codes and corresponding locations for multiple mobile devices.

6. The method of claim 5, further comprising:
receiving a second call request from a second mobile device, the second call request comprising a request for voice communications with the emergency response service;
receiving a second location code from the second mobile device;
determining that the second location code is not indicated by the first data structure;
referencing the second data structure to determine a second location that corresponds to the second location code; and
reporting the second location to the emergency response service.

7. The method of claim 1, wherein the one or more configuration parameters of the mobile device comprise wireless local-area network communication parameters.

8. The method of claim 1, wherein the one or more configuration parameters of the mobile device comprise:
a public IP address associated with the mobile device;
an SSID (service set identifier) of a Wi-Fi access point through which the mobile device is communicating;
a MAC (media access control) address of the Wi-Fi access point; and
a network IP (internet protocol) address of the mobile device.

9. A method implemented on a telecommunications device by a processor configured to execute instructions that, when executed by the processor, direct the telecommunications device to perform acts comprising:
connecting to a wireless local-area network (WLAN) for communications with a voice services provider;
obtaining one or more parameters of the WLAN network;
cryptographically hashing the one or more parameters to create a location code;
sending the location code to the voice services provider, the service provider storing the location code in association with location of the telecommunications device; and
communicating with the voice services provider to initiate a voice call to an emergency response service.

10. The method of claim 9, the telecommunications device comprising one or more of:
a computer;
telephone handset;
a smartphone; or
a wearable device.

11. The method of claim 9, the parameters comprising parameters of a wireless communications access point.

12. The method of claim 9, the parameters comprising one or more of:
a public IP address associated with the telecommunications device;
a name of a wireless access point through which the telecommunications device is communicating;
a MAC (media access control) address of the wireless access point; and
a network IP address of the telecommunications device.

13. A system comprising:
one or more data structures, each data structure having one or more entries, each entry comprising a location code and a corresponding street address, wherein at least one of the location codes is a cryptographic hash of one or more Wi-Fi configuration parameters;
a call handler configured to perform actions comprising:
receiving a first call request from a first cellular communications device, the first call request comprising a request for voice communications with an emergency response service;
receiving a first location code from the first cellular communication device;
referencing the one or more data structures to determine a first street address corresponding to the first location code; and
reporting the first street address to the emergency response service.

14. The system of claim 13, wherein the one or more data structures comprise:
- a device data structure having street addresses corresponding to historical locations of the first cellular communications device; and
- a master data structure having street addresses corresponding to historical locations of multiple cellular communications devices.

15. The system of claim 14, the actions further comprising:
- searching the device data structure for the first location code; and
- if the first location code is not in the device data structure, searching the master data structure for the first location code.

16. The system of claim 15, the actions further comprising,
- if the first location code is not in the device data structure and the first location code is not in the master data structure, (a) prompting a user of the first cellular communication device for a current street address and (b) adding the first location code and the current street address to both of the device data structure and the master data structure.

17. The system of claim 13, the actions further comprising:
- receiving a second location code from a second cellular communications device;
- determining that the second location code is not indicated by the one or more data structures;
- prompting a user of the first cellular communication device for a current street address; and
- adding the second location code and the current street address to at least one of the one or more data structures.

18. The system of claim 13, wherein the first location code comprises a cryptographic hash of one or more Wi-Fi configuration parameters.

19. The system of claim 18, wherein the one or more configuration parameters comprise:
- a public IP address associated with the first cellular communications device;
- a name of a Wi-Fi access point through which the first cellular communications device is communicating;
- a MAC (media access control) address of the Wi-Fi access point; and
- a network IP (internet protocol) address of the location code.

* * * * *